United States Patent
Gornish

(10) Patent No.: US 6,314,431 B1
(45) Date of Patent: Nov. 6, 2001

(54) METHOD, SYSTEM, AND APPARATUS TO IMPROVE INSTRUCTION PRE-FETCHING ON COMPUTER SYSTEMS

(75) Inventor: Edward H. Gornish, Palo Alto, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/387,392

(22) Filed: Sep. 2, 1999

(51) Int. Cl.[7] .................. G06F 17/30; G06F 15/00; G06F 12/00
(52) U.S. Cl. .................. 707/103; 712/207; 711/125
(58) Field of Search .................. 712/207, 205, 712/206; 707/100, 103; 711/125

(56) References Cited

U.S. PATENT DOCUMENTS

| | | | |
|---|---|---|---|
| 5,412,786 | * 5/1995 | Kusano | 712/205 |
| 5,511,175 | * 4/1996 | Favor et al. | 336/192 |
| 5,515,518 | * 5/1996 | Stiles et al. | 712/239 |
| 5,721,864 | * 2/1998 | Chiarot et al. | 711/137 |
| 5,752,037 | 5/1998 | Gornish et al. | 395/709 |
| 5,799,164 | * 8/1998 | Sollars | 711/137 |
| 5,819,079 | * 10/1998 | Glew et al. | 712/237 |
| 5,857,103 | * 1/1999 | Grove | 717/5 |
| 5,860,150 | * 1/1999 | Chiarot et al. | 711/213 |
| 5,964,867 | * 10/1999 | Anderson et al. | 712/219 |
| 6,029,228 | * 2/2000 | Cai et al. | 711/137 |
| 6,175,814 | * 1/2001 | Chrysos et al. | 702/182 |
| 6,185,676 | * 2/2001 | Poplingher et al. | 712/239 |
| 6,199,154 | * 3/2001 | Witt | 712/205 |
| 6,212,603 | * 4/2001 | McInerney et al. | 711/125 |
| 6,230,260 | * 5/2001 | Luick | 712/239 |

OTHER PUBLICATIONS

David A. Patterson, et al., "Computer Architecture A Quantitative Approach", 2nd Edition, pp. 284–289, 380–384 plus (2) cover pages.

Steven S. Muchnick, "Advanced Compiler Design and Implementation", pp. 597–599 plus (2) cover pages.

Chi–Keung Luk et al., "Cooperative Prefetching: Compiler and Hardware support for Effective Instruction Prefetching in Modern Processors", To appear in Proceedings of Micro–31, Nov. 30–Dec. 2, 1998; 6 pages.

(List continued on next page.)

*Primary Examiner*—Frantz Coby

(57) ABSTRACT

The present invention enables efficient pre-fetching of instructions. The present invention novelly determines a location for insertion of pre-fetch instructions earlier than in the past and in a cost effective manner. Therefore, the present invention introduces more control into the determination of when to initiate instruction pre-fetching than in the past. The present invention pre-fetches instructions accurately and launches instructions early enough to avoid cache miss latency. Also the present invention enables pre-fetching of instructions with the appropriate coverage. The present invention novelly generates pre-fetch instructions that have improved coverage over pre-fetching of the past by testing if the probability of a pre-fetch is cost effective and by determining whether the predicted size of a pre-fetched trace supports cost effective pre-fetching. The present invention assumes the existence of and utilizes the computer-based hardware capabilities of: a computer-based pre-fetch instruction that pre-fetches the cache line corresponding to a particular instruction address, and an augmentation to a computer-based branch instruction that can specify whether sequential instruction pre-fetching should be initiated at the target of a branch instruction.

9 Claims, 12 Drawing Sheets

OTHER PUBLICATIONS

Norman P. Jouppi, "Improving Direct–Mapped Cache Performance by the Addition of a Small Fully–Associative Cache and Prefetch Buffers", IEEE, 17th ISCA, 1990, pp. 364–373.

Doug Joseph, et al., "Prefetching using Markov Predictors", To appear in 1997 Proceedings of the International Sympo sium on Computer Architecture (ISCA'90), Jun. 1997, 6 pages.

"IA–64 Instructions", (visited Jul. 13, 1999) <http://developer.intel.com/vtune/cbts/ia64tuts/templ/gloss>.

* cited by examiner

METHOD, SYSTEM, AND APPARATUS TO IMPROVE INSTRUCTION PRE-FETCHING ON COMPUTER SYSTEMS

FIELD OF THE INVENTION

The present invention relates generally to a method and apparatus for improving performance of instruction pre-fetching on computer systems.

BACKGROUND OF THE INVENTION

Typically computers require fast access to portions of computer memory to enable timely execution of instructions that are stored in the memory and are subsequently executed by the computer processor. Management of the location of an instruction that executes in a computer system requires allocation of the location of an instruction in a timely manner to ensure that the instruction will be available for execution without additional access of the instruction from the memory, cache memory, or another storage medium. Cache miss latency is a performance problem in the execution of computer-based instructions. It will be appreciated that cache memory is a small, fast unit of the memory and may be located close to the processor to ensure fast access to information in the cache by the processor. The terms "cache" and "cache memory" will be used interchangeably herein.

Typically the speed of operation of the processor is faster than the speed of access to cache memory. When the processor accesses information in the cache this is referred to herein as a "cache hit." When the processor is not able to access information in the cache this is referred to herein as a "cache miss." Cache miss latency has increased as the disparity between the speed required for processor operations and the speed required to access the memory has increased.

Pre-fetching is the fetching of instructions into the cache before they are needed. The pre-fetching distance is the elapsed time between initiating and using the result of the pre-fetch and should be large enough to hide cache miss latency. However, the pre-fetch distance should not be so large that the pre-fetched instructions are displaced by other information placed in the cache before the pre-fetched instructions are used. Therefore, timeliness is the measure of whether an instruction is pre-fetched before it is needed but not pre-fetched so soon that it must be discarded before it can be used. Generating timely pre-fetches has been a problem with pre-fetching solutions.

A pre-fetch is useless if it brings a line into the cache which will not be used before it is displaced. A pre-fetch is accurate if it is actually used. It will be appreciated that a "line" includes at least one instruction and represents a unit of instructions that may be pre-fetched on a computer system.

A problem with pre-fetching is obtaining the appropriate coverage of a pre-fetch. It will be appreciated that coverage is the identification of useful pre-fetched instruction requests while minimizing useless pre-fetched instruction requests. Attempting to obtain optimal coverage can increase the probability of useless pre-fetches. That is, larger amounts of pre-fetched instructions may increase the probability of useless pre-fetches. The pre-fetch distance should be large enough to hide the cache miss latency while not being so large as to increase the amount of unnecessary pre-fetches and has been a problem in the past.

Pre-fetching problems are discussed with reference to *Cooperative Prefetching: Compiler and Hardware Support for Effective Instruction Prefetching in Modern Processors,"* Chi-Keung Luk and Todd C. Mowry, Proceedings of Micro-31, Nov. 30–Dec. 2, 1998, and *Prefetching using Markov Predictors,* Doug Joseph and Dirk Grunwald, 1997 Proceedings of the International Symposium on Computer Architecture, June 1997.

SUMMARY OF THE INVENTION

The present invention is a method and apparatus for improving instruction pre-fetching in computer systems.

Pre-fetching may be focused on instructions or data. The present invention enables efficient pre-fetching of instructions. The present invention novelly determines a location for insertion in a program of pre-fetched instructions earlier than in the past and in a cost effective manner. Therefore, the present invention introduces more control into the determination of when to initiate instruction pre-fetching than in the past. The present invention efficiently inserts pre-fetched code into a code sequence to enable sequential code execution with reduced cache miss latency during execution.

The present invention assumes the existence of and utilizes the computer-based hardware capabilities of: a computer-based pre-fetch instruction that pre-fetches the cache line corresponding to a particular instruction address, and an augmentation to a computer-based branch instruction that can specify whether sequential instruction pre-fetching should be initiated at the target of a branch instruction.

The present invention may perform during compile time or run-time. When the present invention operates during compile-time it advantageously uses information available before program execution thereby reducing the overhead required for pre-fetching during program execution. When the present invention operates during run-time it exploits computer system features that allow pre-fetching of instructions that are introduced into the execution process. The term "compile-time" refers to the period of compilation before a computer program is loaded and executing on the computer system, and the term "run-time" refers to the period of compilation after the computer program is loaded and is able to execute on the computer system.

The present invention operates on a computer having memory that is accessed by at least one instruction generated from a computer readable medium encoded in a program that executes on the computer. The computer includes execution cycles and executes instructions in an order during the execution cycles. Further, the instruction includes at least one value. The present invention determines a minimum threshold value that defines a cost effective pre-fetching size. The present embodiment also accesses a current branch instruction in the program that is associated with a target instruction.

The present invention executes a loop while the current branch instruction is accessed in the source program. Within the loop the present embodiment inserts the pre-fetch instruction for the target instruction in the program if pre-fetching the target instruction is cost effective. Also a target basic block associated with the target instruction is accessed so that a predicted target trace size is determined. Further, the augmented branch instruction is generated enabling sequential instruction pre-fetching during execution if the predicted target trace size is greater than the minimum threshold thereby improving pre-fetching on the computer.

The loop execution is managed by accessing a next branch instruction if the next branch instruction has not been accessed. Further the next branch instruction is associated with a target instruction. If the next branch instruction is accessed the next branch instruction is labeled as the current branch instruction, typically by a move instruction or copy instruction. Otherwise the current branch instruction is labeled as not accessed and execution of the loop is therefore completed.

In one embodiment of the present invention insertion of the pre-fetch instruction includes defining an advance_cycles value that is a cost effective number of execution cycles in advance of the current branch instruction, and advance_cycles identifies the location at which to insert said pre-fetch instruction. Then the present embodiment inserts the pre-fetch instruction advance_cycles in advance of the current branch instruction.

In another embodiment, at least one instruction slot that is associated with an instruction_slot_execution_cycle is identified. Then the alternative embodiment inserts the pre-fetch instruction at the instruction_slot_execution_cycle if the instruction_slot_execution_cycle is located advance_cycles in advance of the branch instruction. Otherwise the pre-fetch instruction is inserted at the instruction_slot_execution_cycle if the instruction_slot_execution_cycle is located in advance of advance_cycles, in advance of the current branch instruction, and the instruction_slot_execution_cycle is located closest among the instruction_slot_execution_cycles to advance_cycles in advance of the current branch instruction.

If the previous conditions are not met the alternative embodiment inserts the pre-fetch instruction at the instruction_slot_execution_cycle if the instruction_slot_execution_cycle is located after advance_cycles in advance of the current branch instruction and before the current branch instruction, and the instruction_slot_execution_cycle is closest among the instruction slot_execution_cycles to advance_cycles in advance of the current branch instruction.

Accordingly it is an object of the invention to achieve a timely pre-fetching distance in which the pre-fetched instructions are fetched before they are needed but not pre-fetched so soon that they must be discarded before they can be used. That is, the present invention pre-fetches instructions accurately. Therefore, the present invention pre-fetches instructions in a timely manner. That is, the instructions are launched early enough to avoid cache miss latency. The present invention may pre-fetch an instruction or a cache line and may thereby generate a pre-fetched trace. A "trace" is group of instructions that are executed. Based on a predicted path of execution of the instructions the trace may include one or more basic blocks that may be pre-fetched to improve performance.

It is another object of the invention to enable pre-fetching of instructions with the appropriate coverage. The present invention novelly generates pre-fetched instructions that have improved coverage over pre-fetching of the past by determining if the probability of a pre-fetch is cost effective and by determining whether the size of a pre-fetched trace supports cost effective pre-fetching.

Other aspects and advantages of the present invention will become apparent from the following detailed description, taken in conjunction with the accompanying drawings, illustrating by way of example the principles of the invention.

BRIEF DESCRIPTION OF THE DRAWINGS

The accompanying drawings are incorporated in and constitute a part of this specification and, together with the description, explain the advantages and principles of the invention. In the drawings.

FIG. 5E is a block diagram that illustrates an example of an efficient location of an available instruction slot by the operation of the alternative embodiment as shown in

FIG. 5D; and

DETAILED DESCRIPTION

Figure 1A:
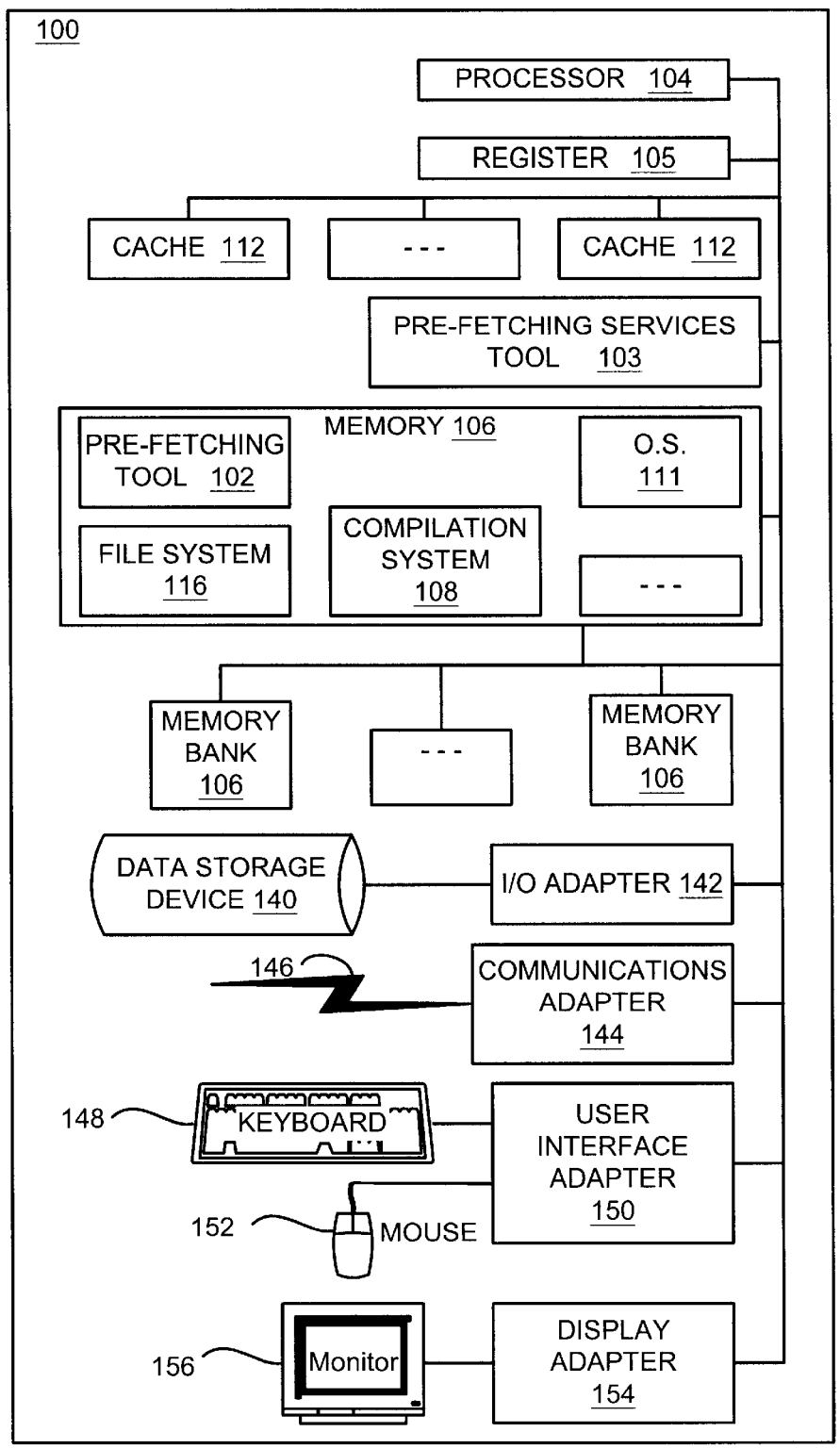
FIG. 1A is a block diagram that illustrates a computer system including the pre-fetching tool.

In the following detailed description and in the several figures of the drawings, like elements are identified with like reference numerals.

Figure 2:
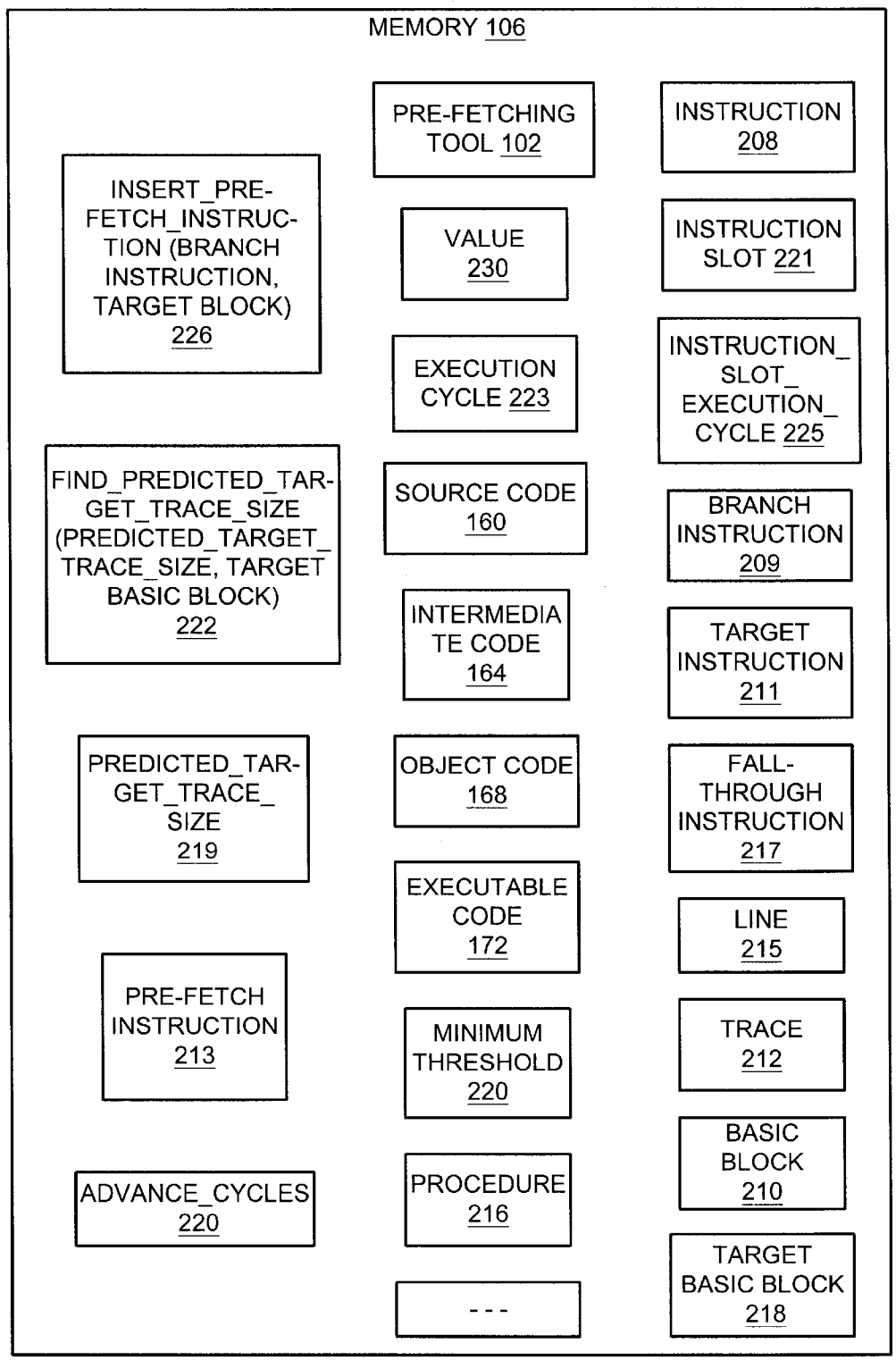
FIG. 2 is a block diagram that illustrates the memory including data structures and functions of the computer system and those used by the pre-fetching tool.

Broadly stated, FIG. 1A illustrates a pre-fetching tool 102 that operates in a computer system 100 and that novelly pre-fetches instructions 208 (as shown in FIG. 2) that may be executed on the computer system 100. It will be appreciated that management of the location of an instruction 208 that is executed in a computer system 100 requires allocation of the instruction 208 in a timely manner to ensure that the instruction 208 will be available for execution without additional access to the memory 106, the cache 112, or another storage medium.

The pre-fetching tool 102 may cooperate with a pre-fetching services tool 103 that provides services used in the operation of the pre-fetching tool 102. The pre-fetching services tool 103 includes the service of pre-fetching the cache line 215 corresponding to a particular instruction 208 address, typically via a pre-fetch instruction 213. Further, the pre-fetching services tool 103 includes the service of an augmentation to a branch instruction 209 that specifies whether sequential instruction pre-fetching should be initiated at the target instruction 211 of a branch instruction 209. Therefore, when the pre-fetching tool 102 executes on the computer system 100, it advantageously uses the pre-fetch instruction 213 and the augmented branch instruction 209. The line 215, the pre-fetch instruction 213, the branch instruction 209, and the target instruction 211 are described with reference to FIG. 2.

Therefore, the pre-fetching tool 102 operates in cooperation with the pre-fetching services tool 103, the cache 112, and the memory 106 to locate and fetch instructions from the memory 106 or other storage mediums for operation in the cache 112.

Computer memory 106 may be any of a variety of known memory storage devices or future memory devices, including any commonly available random access memory (RAM), cache memory 112, magnetic medium such as a resident hard disk, or other memory storage devices. In one embodiment the O.S. 111 and the pre-fetching tool 102 may reside in the memory 106 during execution in the computer system 100. The term "storage" refers herein to computer resources such as memory 106, and may be data or instructions 208 used in executing a computer program.

The pre-fetching tool 102 comprises instructions 208 and data that may be referred to as "values" such as integer, real, or complex numbers; or characters. Alternatively, the values 230 (as shown in FIG. 2) may be pointers that reference values 230. Therefore, a pointer provides direction to locate a referenced value 230. Instructions 208 may also include variables that are identifiers for values 230. That is, the variables may provide storage for values 230

More particularly, the instructions 208 may be operating instructions of the computer system 100, such as addresses. The addresses may be computer addresses or virtual, symbolic addresses that refer to computer addresses. For instance, a computer address may be a computer hardware register or a location in the memory 106.

A basic block 210 (as shown in FIG. 2) may end with a jump that transfers control to another basic block 210. The instruction 208 to which the jump passes control may be referred to as a target instruction 211. Further, the instruction 208 that transfers execution control to the target instruction 211 when a condition is met may be referred to as a branch instruction 209. When a branch instruction 209 occurs in the code and if the condition for the branch transfer is not met, a fall-through instruction 217 will be executed and will generally execute quicker than a target instruction 211. It will be appreciated by those skilled in the art that a fall-through instruction 217 is an instruction that is sequentially located with respect to the prior basic block 210.

It will be appreciated that a basic block 210 is a sequence of code and has a single entry instruction 208 and a single exit instruction 208 that may be defined by a branch instruction 209. If the first instruction 208 in the basic block 210 is executed, all other instructions 208 in the basic block 210 will be executed. A basic block 210 may also consist of a single instruction 208.

FIG. 1A further represents the computer system 100 that includes components such as a processor 104, the memory 106, a data storage device 140, an input/output (I/O) adapter 142, a communications adapter 144, a communications network 146, a user interface adapter 150, a keyboard 148, a mouse 152, a display adapter 154, and a computer monitor 156. It will be understood by those skilled in the relevant art that there are many possible configurations of the components of the computer system 100 and that some components that may typically be included in the computer system 100 are not shown.

It will be understood by those skilled in the art that the functions ascribed to the pre-fetching tool 102, or any of its functional files, typically are performed by a central processing unit that is embodied in FIG. 1A as the processor 104 executing such software instructions 208.

The processor 104 typically operates in cooperation with other software programs such as the compilation system 108, the operating system (O.S.) 111, and the pre-fetching tool 102. Henceforth, the fact of such cooperation among the processor 104 and the pre-fetching tool 102, whether implemented in software, hardware, firmware, or any combination thereof, may therefore not be repeated or further described, but will be implied. The pre-fetching tool 102 may operate under the control of the O.S. 111.

The O.S. 111 may cooperate with a file system 116 that manages the storage and access of files within the computer system 100. Files typically include instructions 208 and data. The interaction between the file system 116 and the O.S. 111 will be appreciated by those skilled in the art.

It will also be understood by those skilled in the relevant art that the functions ascribed to the pre-fetching tool 102 and its functional files, whether implemented in software, hardware, firmware, or any combination thereof, may in some embodiments be included in the functions of the O.S. 111. That is, the O.S. 111 may include files from the pre-fetching tool 102. In such embodiments, the functions ascribed to the pre-fetching tool 102 typically are performed by the processor 104 executing such software instructions 208 in cooperation with aspects of the O.S. 111 that incorporate the pre-fetching tool 102. Therefore, in such embodiments, cooperation by the pre-fetching tool 102 with aspects of the O.S. 111 will not be stated, but will be understood to be implied.

The compilation system 108 and the O.S. 111 may also reside in the memory 106 when the pre-fetching tool 102 is operating. Further, the compilation system 108 may operate in cooperation with the O.S. 111 to execute the pre-fetching tool 102. That is, the present embodiment may employ the compilation system 108 to resolve any system-specific information such as address locations that are necessary to execute the pre-fetching tool 102 in the computer system 100.

It will be appreciated that the term "execute" refers to the process of manipulating software or firmware instructions 208 for operation on the computer system 100. The term "execution path" refers to the order of instructions 208 during the execution of the instructions 208. The term "execution cycle" refers to a location in the execution path that identifies the order of execution of an instruction 208. The term "code" refers to instructions 208 or data used by the computer system 100 for the purpose of generating instructions 208 or data that execute in the computer system 100. Also, the term "function" may refer to a software "procedure" such as a unit of code that may be independently compiled. A "program" contains software program code, may contain at least one function, and may be independently compiled and executed.

Figure 1B:
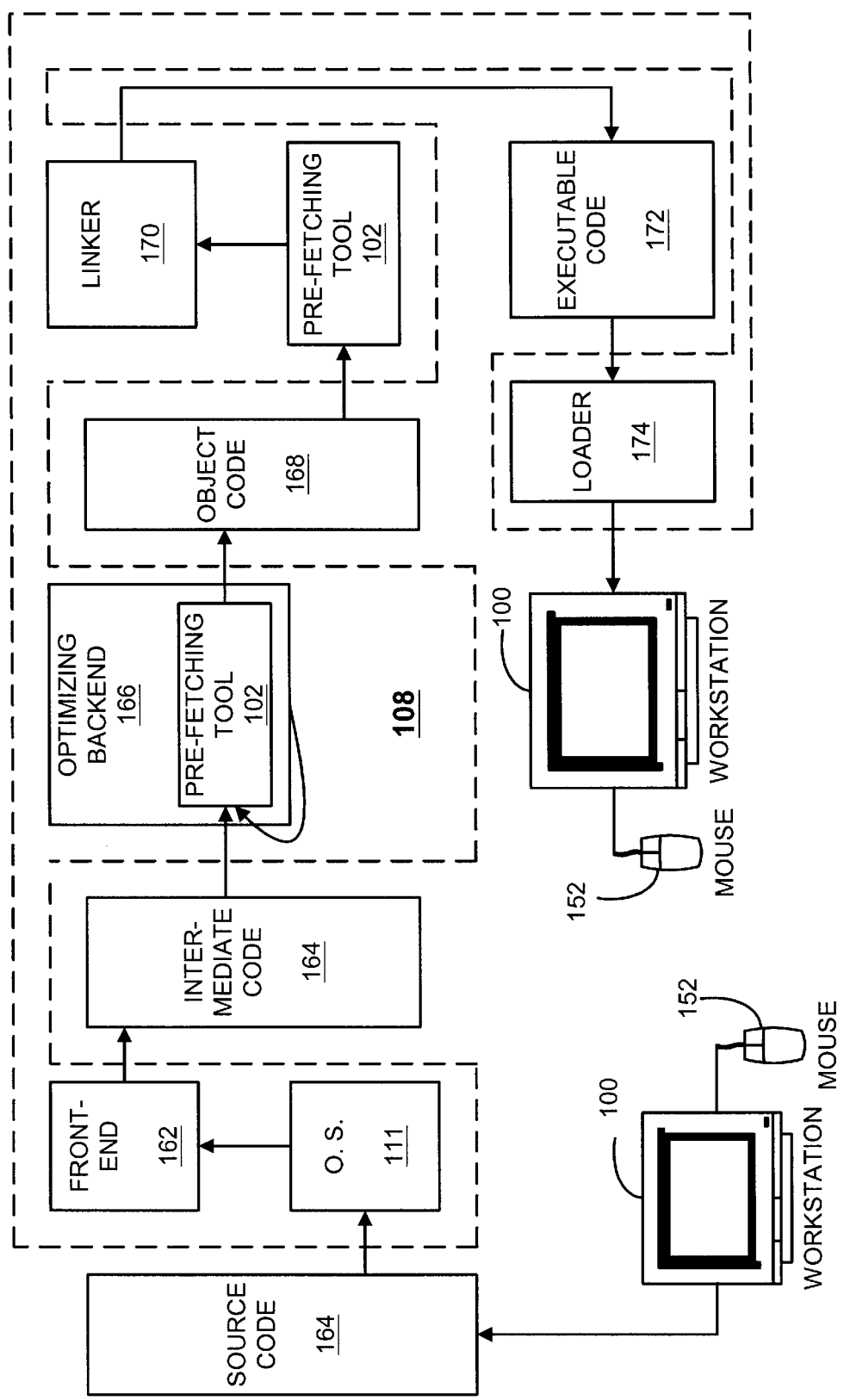
FIG. 1B is a block diagram that illustrates a form of compiler technology that operates with the pre-fetching tool.
Figure 1C:
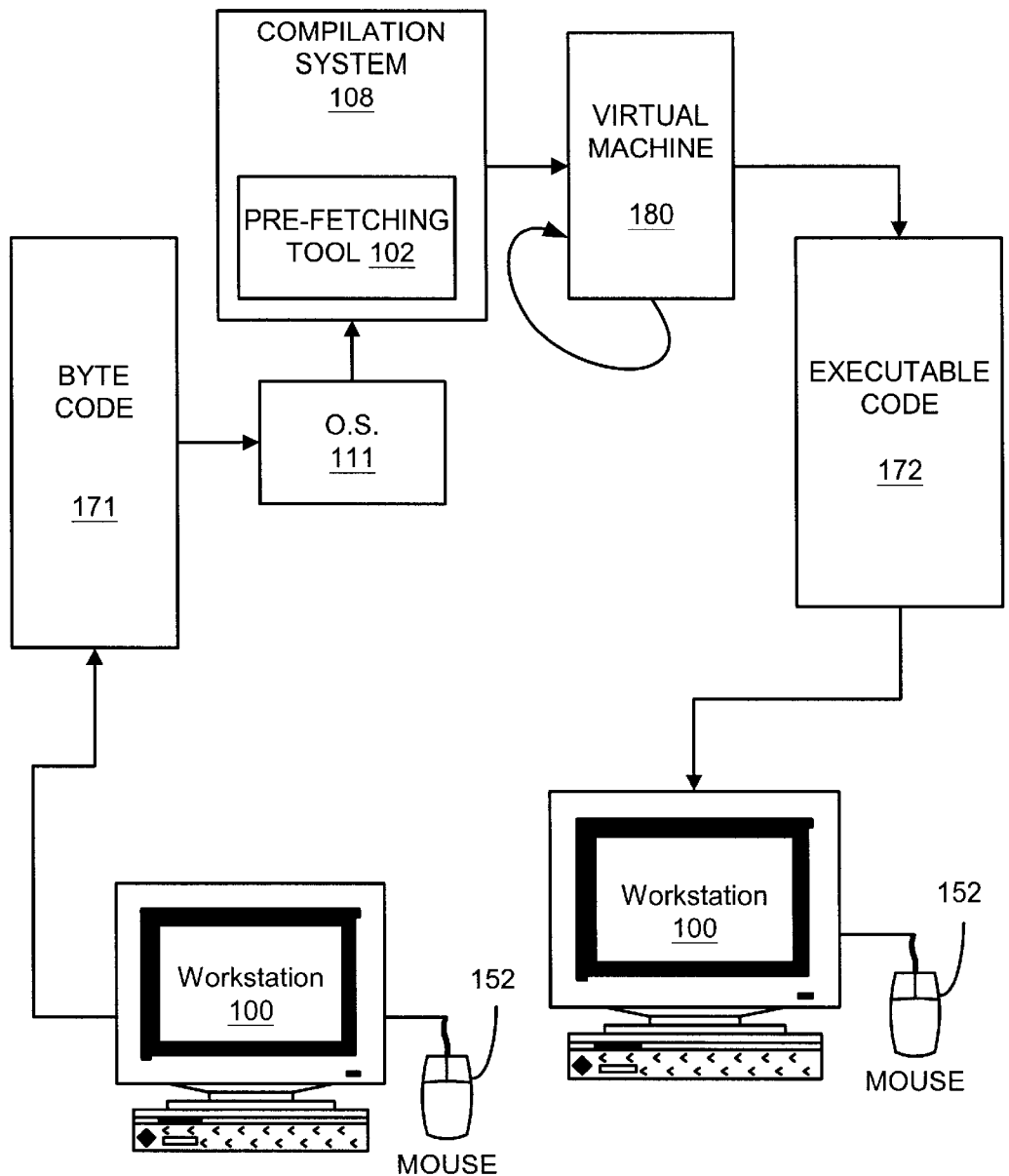
FIG. 1C is a block diagram that illustrates a form of object-based compiler technology that operates with the pre-fetching tool.

Alternatively the present embodiment may operate with a virtual machine 180 (as shown in FIG. 1C), such as the product marketed under the trademark JAVA VIRTUAL MACHINE™ that may cooperate with elements of the compilation system 108 to interpret programs for execution in the computer system 100. Further, programs created in program code marketed under the trademark JAVA™ may be managed by the pre-fetching tool 102. Such programs may operate by an object-oriented design that includes the use of objects.

The pre-fetching tool 102 may be implemented in the "C" programming language, although it will be understood by those skilled in the relevant art that other programming languages could be used. Also, the pre-fetching tool 102 may be implemented in any combination of software, hardware, or firmware.

The data storage device 140 may be any of a variety of known or future devices, including a compact disk drive, a tape drive, a removable hard disk drive, or a diskette drive. Any such program storage device may communicate with the I/O adapter 142, that in turn communicates with other components in the computer system 100, to retrieve and store data used by the computer system 100. As will be appreciated, such program storage devices typically include a computer usable storage medium having stored therein a computer software program and data.

Input devices could include any of a variety of known I/O devices for accepting information from a user, whether a human or a machine, whether local or remote. Such devices include, for example a keyboard 148, a mouse 152, a touch-screen display, a touch pad, a microphone with a voice recognition device, a network card, or a modem. The input devices may communicate with a user interface I/O adapter 142 that in turn communicates with components in the computer system 100 to process I/O commands. Output devices could include any of a variety of known I/O devices for presenting information to a user, whether a human or a machine, whether local or remote. Such devices include, for example, the computer monitor 156, a printer, an audio speaker with a voice synthesis device, a network card, or a modem. Output devices such as the monitor 156 may communicate with the components in the computer system 100 through the display adapter 154. Input/output devices could also include any of a variety of known data storage devices 140 including a compact disk drive, a tape drive, a removable hard disk drive, or a diskette drive.

By way of illustration, program code may typically be loaded through an input device and may be stored on the data storage device 140. A copy of the code or portions of it, may alternatively be placed by the processor 104 into the memory 106 for execution on the computer system 100.

The computer system 100 may communicate with the network 146 through a communications adapter 144, such as a networking card. The network 146 may be a local area network, a wide area network, or another known computer network or future computer network. It will be appreciated that the I/O device used by the pre-fetching tool 102 may be connected to the network 146 through the communications adapter 146 and therefore may not be co-located with the computer system 100. It will be further appreciated that other portions of the computer system 100, such as the data storage device 140 and the monitor 156, may be connected to the network 146 through the communications adapter 144 and may not be co-located.

As shown in FIG. 1B the present embodiment is a form of compiler technology that may use software source code 160 that is generated from input computer system 100 I/O devices including a keyboard 148 (as shown in FIG. 1A) and a mouse 152. It will be appreciated that the present embodiment operates on any multi-purpose computer system 100 and is not limited to the illustration herein. A software developer may create source code 160 typically in a high-level programming language such as "C." The computer system 100 may manage the processing of the source code 160 by the O.S. 111 that may direct the processing of the source code 160 by a compiler front-end 162. The compiler front-end 162 may generate intermediate code 164 from the source code 160 and may operate on high-level intermediate code 164. The front-end 162 may optimize code while preserving the structure and sequence of source operations. For instance, the front-end 162 may optimize array contents while retaining the array accesses in the source code 160.

Optimization techniques are utilized by the present embodiment and may generate intermediate code 164 that is processed by an optimizing back-end 166. The intermediate code 164 is a list of intermediate-level language instructions 208 (as shown in FIG. 2) and the pre-fetching tool 102 may operate on the intermediate code 164. Further, the pre-fetching tool 102 may be included in the optimizing back-end 166 that also operates on the intermediate code 164. By means of an example, if the code semantics can be preserved the optimizing back-end 166 may move frequently used instructions 208 to locations so that execution of the instructions 208 may be optimized. The optimizing back-end 166 may generate object code 168 that includes optimization changes which may be dependent on the particular multi-purpose computer system 100 on which the compiler optimizer technology operates. These machine-specific changes may allow the optimizing back-end 166 to generate code that is highly tailored to optimally run on a specific multi-purpose computer system 100; for example code may be tailored to support different cache 106 organizations or a different number of computer processors 104 (as are shown in FIG. 1A). Further, the optimizing back-end 166 may execute the intermediate code 164 more than once and thereby may make iterative changes in the intermediate code 164 to enhance further processing by the optimizing back-end 166.

In the present embodiment the linker 170 may operate on the output of the back-end 166 which may be object code 168. In order to execute the object code 168 it may be combined with one or more object code modules to create combined user process executable code 172 by a process known as linking. The present embodiment may employ a linker 170 to resolve any undefined computer location references in the object code 168 and to generate executable code 172 capable of executing on an output multi-purpose computer system 100 with I/O devices such as a keyboard 148 and a mouse 152. It will be appreciated that the input computer system 100 and the output computer system 100 may be the same computer system 100 and are not limited to the configuration illustrated. The pre-fetching tool 102 may operate on object code 168 to introduce pre-fetching into the object code 168 prior to linking.

In the present embodiment the executable code 172 is formatted to enable a loader 174 to load the executable code 172 into the computer system 100 for execution. The executable code 172 may be any of a variety of known executable files or an executable file of a type to be developed in the future. Examples of such known files are those having an extension of ".exe" operating under a DOS or Windows operating system or an "a.out" file of a UNIX® operating system. It will be appreciated that typically the compilation system 108 may include the front-end 162, the optimizing back-end 164, the linker 170, and the loader 174. The pre-fetching tool 102 may also be included in the compilation system 108.

FIG. 1C is a block diagram that illustrates the operation of the pre-fetching tool 102 that operates in coordination with a virtual machine 180 such as the product marketed under the trademark JAVA Virtual Machine.™ Byte code 171 typically is loaded through an input device and may be stored on the data storage device 140 (as shown in FIG. 1A). A copy of the byte code 171 or portions of it, may alternatively be placed by the processor 104 into the memory 106 (as are shown in FIG. 1A) for execution on the computer system 100. The O.S. 111 may operate to associate the byte code 171 with the compilation system 108 that may generate code for use by the virtual machine 180. Further, the pre-fetching tool 102 may be included in the compilation system 108 and may pre-fetch instructions 208 (as shown in FIG. 2) that are used by the virtual machine 180. It will be appreciated that the virtual machine 180 may then operate, typically in an iterative manner, to create optimized executable code 172 that executes on the computer system 100.

FIG. 2 illustrates data structures and functions used by the pre-fetching tool 102 that may be stored in the memory 106. The memory 106 may include the following:

a pre-fetching tool 102 that pre-fetches instructions 208 that are executed on the computer system 100 (as shown in FIG. 1A);

instructions 208 that are operating directives of the computer system 100;

a value 330 that is computer-based information;

an instruction slot 221 that is an available location of an instruction 208;

an execution cycle 223 that refers to a location in the execution path that identifies the order of execution of an instruction 208;

an instruction_slot_execution_cycle 225 that refers to the execution cycle 223 associated with the instruction slot 221;

a branch instruction 209 that can specify a condition that determines whether execution should proceed to the target instruction 211;

a target instruction 211 that is the instruction 208 to which a branch instruction 209 passes execution control, and is the first instruction 208 of a target basic block 218;

a fall-through instruction 217 that will be executed if the condition for a branch transfer is not met;

a line 215, or cache line 215, that includes at least one instruction 208 and represents a unit of instructions 208 that are transferred between various levels in the hierarchy of the memory 106;

a trace 212 that is a unit of a sequence of instructions 208 that are executed and based on a predicted path of execution of the instructions 208, considering the possible branches that may be taken, may include one or more basic blocks 210 or lines 215 that may be pre-fetched to improve performance;

a basic block 210 that is a sequence of instructions 208 that execute on a computer system 100, and the terms "basic block" and "code block" will be used interchangeably herein;

a target basic block 218 that is the basic block 210 associated with the target instruction 211;

a procedure 216 that is a unit of code that may be independently compiled;

source code 160 that is generated from a computer system 100 and that is typically written in a high-level programming language such as "C;"

intermediate code 164 that is a list of intermediate-level language instructions 208;

object code 168 that includes optimization changes which maybe dependent on the particular multi-purpose computer system 100 on which the compilation system 108 operates;

executable code 172 that is capable of executing on a multi-purpose computer system 100;

a minimum threshold 220 that is the value 230 representing the minimum size of a trace 212 such that pre-fetching the trace is cost effective, where "cost effective" refers herein to the cost of instruction pre-fetching on a computer system 100;

Insert_Pre-Fetch_Instruction (Branch Instruction 209, Target Instruction 211) 226 that is a procedure 216 that efficiently locates the insertion point of a pre-fetch instruction 113 for a target instruction 211;

Find_Predicted_Target_Trace_Size (Predicted_Target_Trace_Size 219, Target Basic Block 218) 222 that is a procedure 216 that determines the predicted_target_trace_size 219 of a trace 212;

a predicted_target_trace_size 219 that is value 230 of the size of a predicted trace 212;

a pre-fetch instruction 213 that pre-fetches a target instruction 211;

advance_cycles 220 that is the value 230 representing the number of machine execution cycles 223 before the branch instruction 209 to insert the pre-fetch instruction 211;

as well as other data structures and functions.

Figure 3:
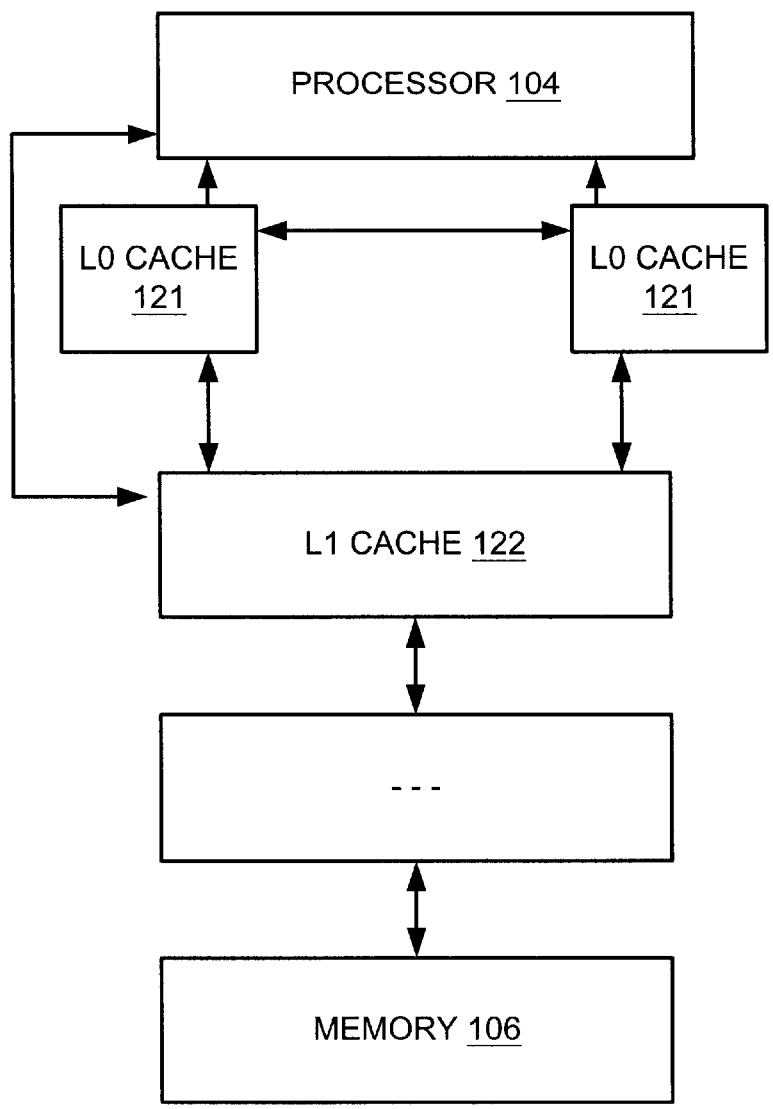
FIG. 3 is a block diagram that illustrates an operation of a processor and cache.

FIG. 3 is a block diagram that illustrates a typical operation of a computer system 100 in which a processor 104 and cache 112 (as are shown in FIG. 1A) operate. The L0 cache 121 is situated in the computer system 100 to ensure its quick access by the processor 104, typically close to the processor 104.

L0 cache 121 may be partitioned into cache 112 that includes data and instructions 208 (as shown in FIG. 2) to enable efficient access of data and instructions 208 from the L0 cache 121. Partitioned cache 112 is discussed with reference to *Computer Architecture a Quantitative Approach,* John L. Hennessy and David A. Patterson, 1996.

Further, information may be transmitted between the processor 104 and a cache 112 typically referred to as "L1 cache." That is data located in the L1 cache 122 or generated by the operation of the processor 104 may be transmitted between the processor unit 104 and the L1 cache 122. Also instructions 208 from the processor 104 may be transmitted to the L1 cache 122 for storage.

Further, data and instructions 208 may be moved between the L0 cache 121 and the L1 cache 122 to enable faster access to the information stored in the L0 cache 121 than the information stored in the L1 cache 122. Also, the levels of cache 112 are not limited to the L0 cache 121 and the L1 cache 122 as shown in FIG.3. Finally, in the present example the main memory 106 operates in cooperation with the L1 cache 122 to communicate information about data and instructions 208.

Figure 4:
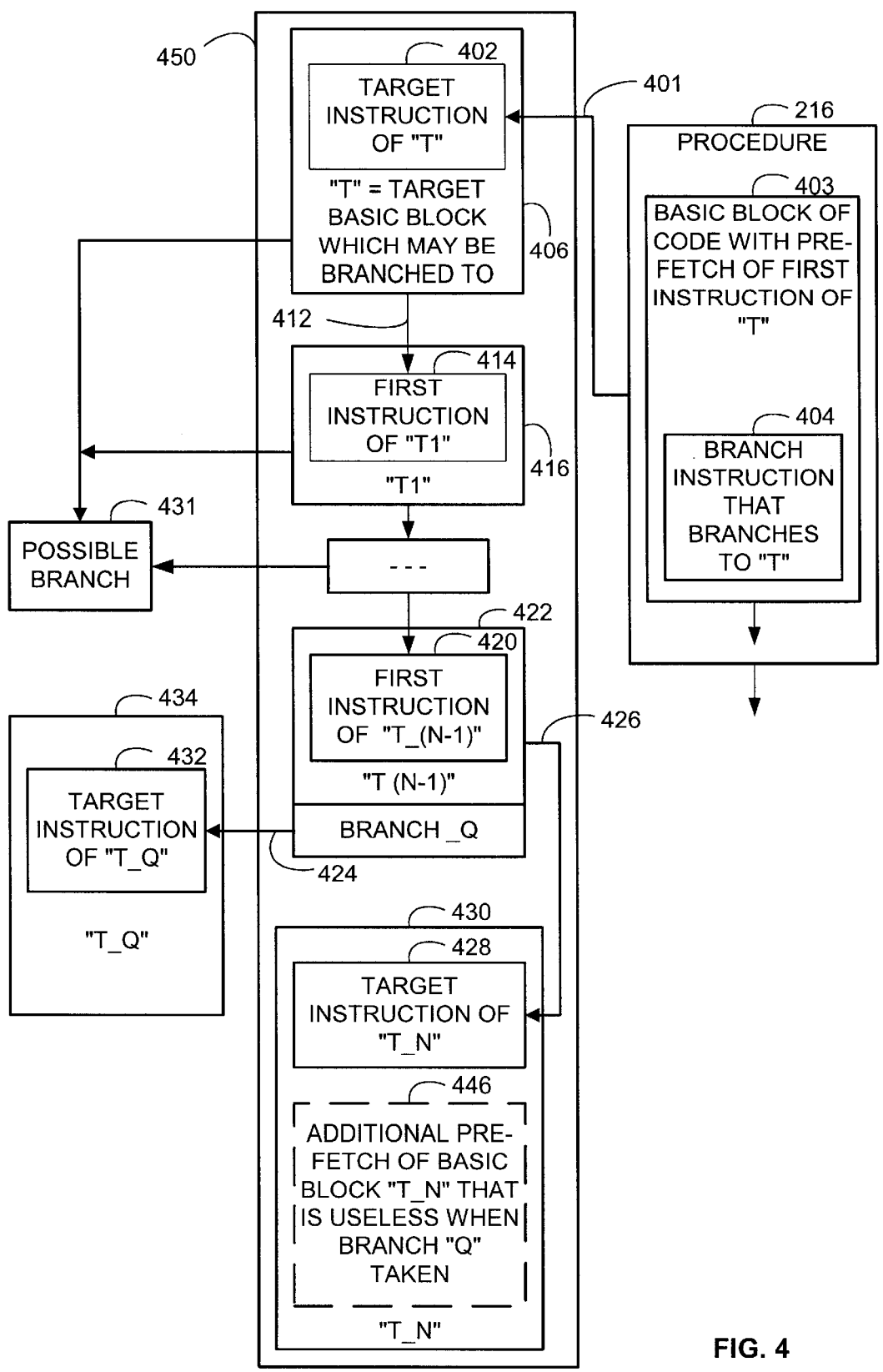
FIG. 4 is a block diagram that illustrates an example of the operation of the pre-fetching tool.

FIG. 4 is a block diagram that illustrates an example of the operation of the pre-fetching tool 102 (as shown in FIG. 2). When a function or a procedure 216 is compiled a branch instruction 209 may be encountered and if a condition in the branch instruction 209 is met, execution branches to a basic block 210 that is not sequentially located with respect to the branch instruction 209 (as are shown in FIG. 2). Otherwise execution of the procedure 216 will execute the fall-through instruction 217 (as shown in FIG. 2). Therefore, in the present example, the branch instruction 209 labeled "T," as shown in element 404, jumps as shown in element 401, to the target instruction 211 as shown in element 402, of the basic block 210 labeled "T" as shown in element 406. Therefore when the present embodiment predicts that the branch to the basic block 210 labeled "T" as shown in element 406 will be taken, a pre-fetch for the target instruction 211 as shown in element 402 is copied into the basic block 210 of the procedure as shown in element 403.

As shown in element 414, when the end of the basic block 210 labeled "T," as shown in element 406 is reached, execution may fall through as shown in element 412 to the first instruction 208 of the basic block 210 labeled "T1" as shown in element 414. Further, the basic block 210 labeled "T1" as shown in element 416 executes to completion and may pass execution to other basic blocks 210. Alternatively execution may branch from any basic block 210 if the condition of the branch instruction 209 is met, as shown in element 431.

More particularly the execution path may move from the last instruction 208 labeled "T1" as shown in element 416 through a series of basic blocks 210 to the first instruction 208 labeled "T_(N−1)" as shown in element 420, of the basic block 210 labeled "T_(N−1)" as shown in element 422. The execution path of the basic block 210 labeled "T_(N−1)" as shown in element 422 includes a condition that determines which of two subsequent execution paths are taken at the conclusion of the execution of the basic block 210 labeled "T(N−1)."

Therefore one execution path is shown in element 426, that is associated with the basic block 210 labeled "T_(N−1)" as shown in element 422, falls through to the target instruction 211 labeled "T_N" as shown in element 428. Alternatively, the execution path as shown in element 424 branches to the target instruction 211 labeled "T_Q," as shown in element 432.

If the target instruction 211 labeled "T_Q" as shown in element 432 is reached, the basic block 210 labeled "T_Q" as shown in element 434 will be executed. Alternatively, if the target instruction 211 labeled "T_N" as shown in element 428 is reached the basic block 210 labeled "T_N" as shown in element 430 will be executed. Therefore, if the branch path labeled 424 is taken the additional pre-fetch of the basic block 210 labeled "T_N," as shown in element 446, is useless since the execution path traveled from the basic block 210 labeled "T_(N−1)" as shown in element 422 travels to the basic block 210 labeled "T_Q" as shown in element 434.

When the pre-fetching tool 102 examines the procedure 216 and reaches the branch instruction 209 as shown in element 404, the pre-fetching tool 102 will operate so that the proper instructions 208 will be pre-fetched in a timely fashion. Consequently, execution of the pre-fetching tool 102 will advantageously operate with the assistance of the pre-fetching services tool 103 (as shown in FIG. 1A) to generate the pre-fetch instruction 213 (as shown in FIG. 2) for the target instruction 211 of the basic block 210 labeled "T" as shown in element 402. It will be appreciated that pre-fetching the trace 212 as shown in element 450 will be performed by the services of the pre-fetching services tool 103 (as shown in FIG. 1A) during execution and as a result of the operation of the pre-fetching tool 102.

Figure 5A:
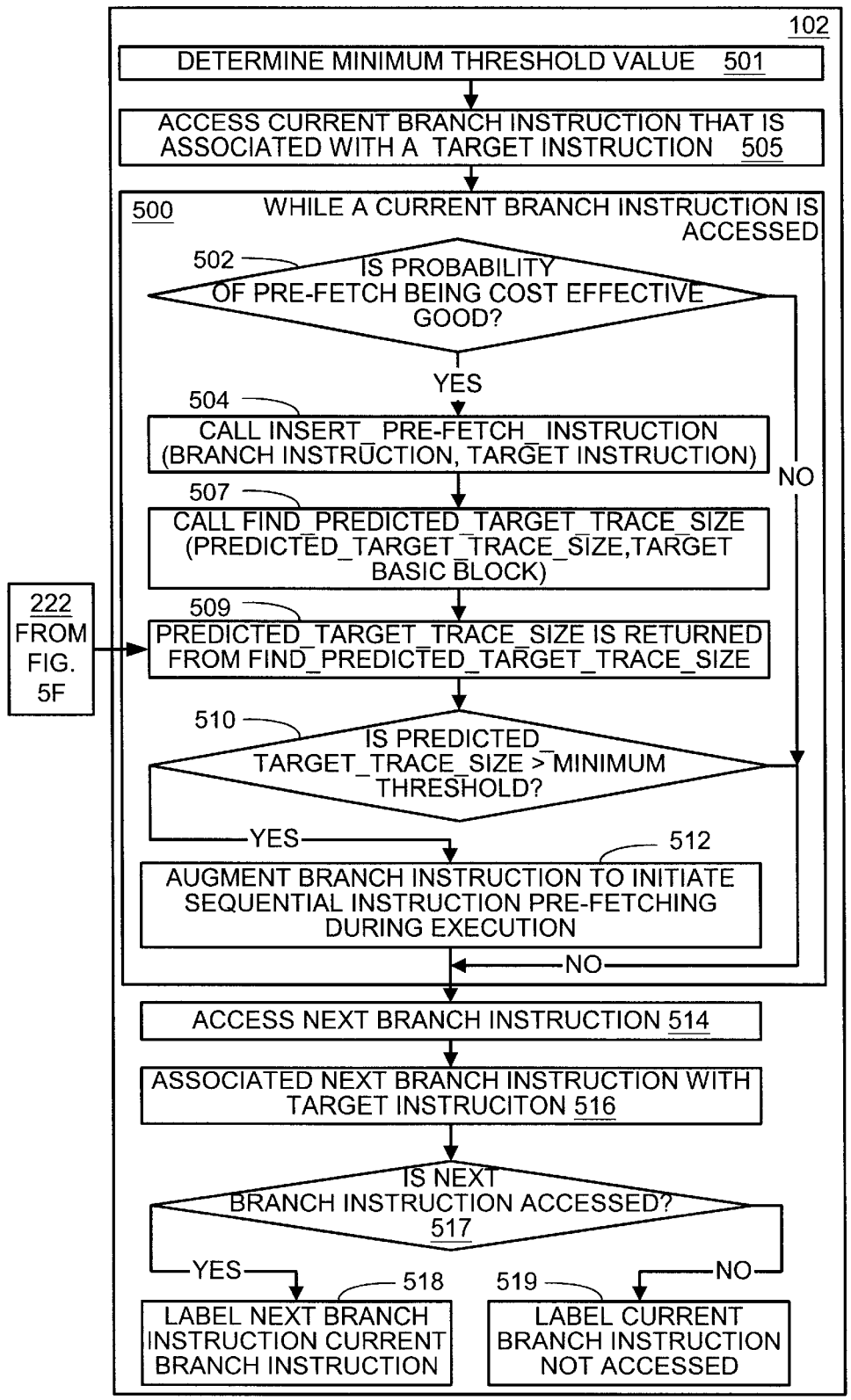
FIG. 5A is a flow diagram that illustrates the operations of the pre-fetching tool.

FIG. 5A is a flow diagram that illustrates the operations of the pre-fetching tool 102. Initially a series of bookkeeping activities may be performed by the pre-fetching tool 102. For instance, as shown in element 501 a minimum threshold value 220 (as shown in FIG. 2) is determined that defines a cost effective pre-fetching size. As shown in element 505, a current branch instruction 209 in the program code is accessed that is associated with a target instruction 211 (as shown in FIG. 2).

As shown in element 500, the pre-fetching tool 102 may operate in a loop while a current branch instruction 209 is accessed such that it is available and not yet processed. Initially a test, as shown in element 502, is conducted to determine if there is a reasonable probability of the pre-fetch being cost effective. That is the pre-fetching tool 102 determines if there is a reasonable probability that the target instruction 211 will be executed. The reasonable probability of a pre-fetch being cost effective may be defined by a number of factors including the cost of performing a pre-fetch operation. If the pre-fetching tool 102 determines that there is a low probability of a cost effective pre-fetch no related operations will be performed with respect to the current branch instruction 209. Therefore, the test as shown in element 502 enables improved coverage of pre-fetched instructions 208 (as shown in FIG. 2).

Alternatively, if the pre-fetching tool 102 determines that a pre-fetch is likely to be cost effective a call is made to a procedure 216 labeled Insert_Pre-Fetch_Instruction (Branch Instruction 209, Target Instruction 211) 226, as shown in element 504. The operation of inserting a pre-fetch instruction 213 for a target instruction 211 enables timely pre-fetching of instructions 208 during execution. An embodiment of the procedure 216 labeled Insert_Pre-Fetch_Instruction (Branch Instruction 209, Target Instruction 211) 226 is described with reference to FIG. 5B and an alternative embodiment of the procedure 216 labeled Insert_Pre-Fetch_Instruction (Branch Instruction 209, Target Instruction 211) 226 is described with reference to FIG. 5D.

When the procedure 216 labeled Insert_Pre-Fetch_Instruction (Branch Instruction 209, Target Instruction 211) 226 has completed execution, a procedure 216 labeled Find_Predicted_Target_Trace_Size 222 is called as shown in element 507. Find_Predicted_Target_Trace_Size 222 returns a predicted_target_trace_size value 219 and is described with reference to FIG. 5F.

A test is performed as shown in element 510 to determine if the predicted_target_trace_size 219 is greater than the minimum threshold 220. A minimum threshold 220 sets the minimum size of a pre-fetched trace 212 such that sequential pre-fetching will be cost effective. For example when the cost of accessing the L1 cache 122 (as shown in FIG. 3) is high the motivation to pre-fetch is also high, and the minimum threshold 220 may be set accordingly. Alternatively, when the L0 cache 121 (as shown in FIG. 3) is small the minimum threshold 220 may be set conservatively to minimize useless pre-fetches. Therefore, the test as shown in element 510 enables improved coverage of pre-fetched instructions 208.

Therefore if the test as shown in element 510 fails, the predicted_target_trace_size 219 is too small to meet the test for cost effectiveness and the pre-fetching tool 102 will not perform further pre-fetch operations with respect to the current branch instruction 209. Alternatively, if the test as shown in element 510 passes, the pre-fetching tool 102 will use the services of the pre-fetching services tool 103 (as shown in FIG. 1A) to generate an augmented branch instruction 209 to initiate pre-fetching of the instructions 208 during execution. Therefore, during execution the pre-fetching services tool 103 provides a pre-fetch instruction 213 and an augmented branch instruction 209 that specifies whether sequential instruction pre-fetching should be initiated at a target instruction 211 as required by the pre-fetching tool 102.

The pre-fetching tool 102 continues as shown in element 514 to access a next branch instruction 209 if there is another branch instruction 209 that has not been accessed. Further the pre-fetching tool 102 associates the next branch instruction 209 with the target instruction as shown in element 516. Then if the next branch was accessed as shown in element 517 the pre-fetching tool 102 labels, as shown in element 518, the next branch instruction 209 as the current branch instruction, typically by a copy instruction 208 or an assignment instruction 208 as will be appreciated by those skilled in the art. This allows the continuance of the looping as shown in element 500. As shown in element 519, if there is no next branch instruction 209 to be processed, the current branch instruction 209 is labeled as not accessed and the operation as shown in element 500 is completed.

Figure 5B:
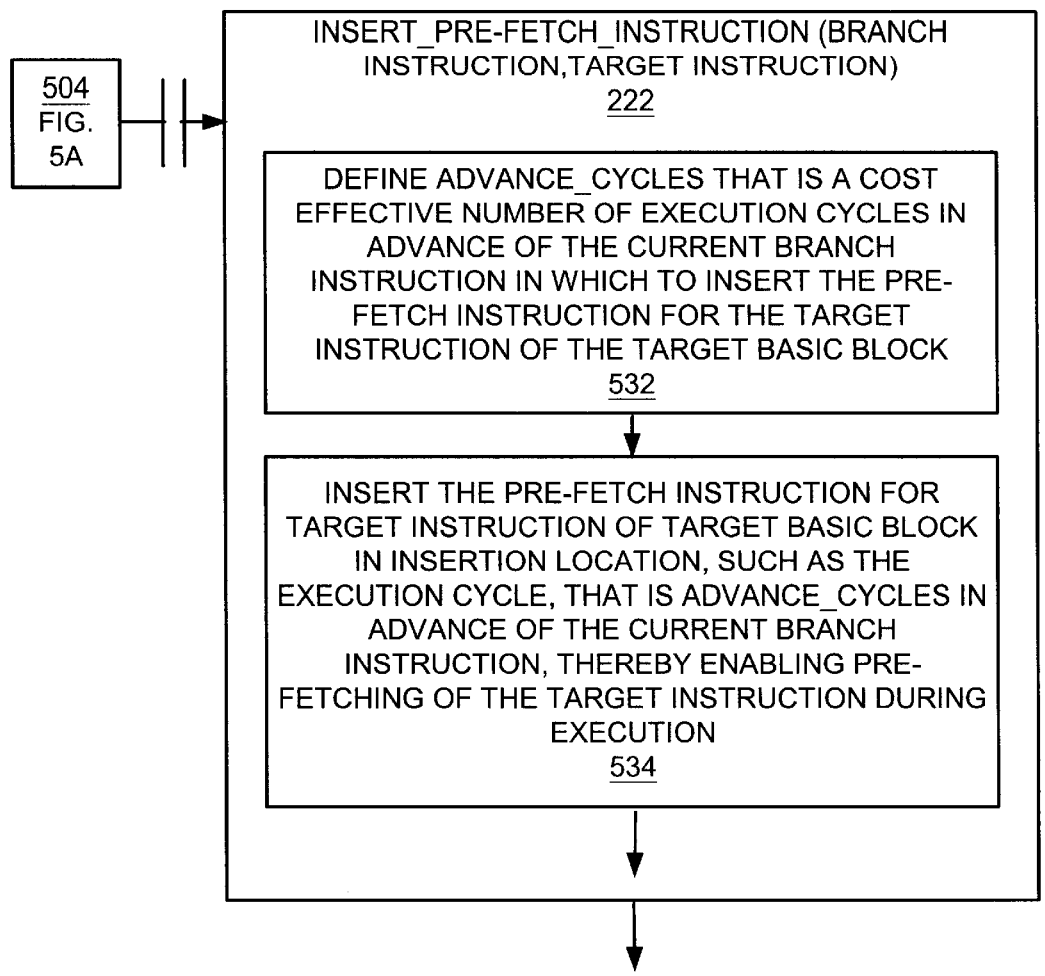
FIG. 5B is a flow diagram that illustrates one embodiment of the operation of inserting a pre-fetch instruction for a target instruction.

FIG. 5B is a flow diagram that illustrates one embodiment of the procedure 216 labeled Insert_Pre-Fetch_Instruction (Branch Instruction 209, Target Instruction 211) 226 that efficiently locates the insertion point, or execution cycle 223 (as shown in FIG. 2), of the pre-fetch instruction 213 for a target instruction 211. The procedure 216 labeled Insert_Pre-Fetch_Instruction (Branch Instruction 209, Target Instruction 211) 226 is called from element 504 as described in FIG. 5A. Therefore as shown in element 532, the pre-fetching tool 102 defines an advance_cycles value 220 (as shown in FIG. 2) that is a cost effective number of execution cycles 223 in advance of the current branch instruction 209 at which to insert the pre-fetch instruction 213. That is, the operation as shown in element 532 defines the location of the execution cycle 223 in which to insert the pre-fetch instruction 213 that is in advance of the branch instruction 209 by the value 230 (as shown in FIG. 2) of advance_cycles 220. Then, as shown in element 534 the pre-fetching tool 102 inserts the pre-fetch instruction 213 for the target instruction 211 (for use by the pre-fetch services tool 103, as shown in FIG. 1A) in the execution cycle 223 located advance_cycles 220 in advance of the current branch instruction 209 thereby enabling pre-fetching of the target instruction 211 during execution.

The value 230, advance_cycles 220, is a number of computer execution cycles 223 in advance of the branch instruction 209 and indicates where the target instruction 211 should be located. Advance_cycles 220 should be large enough to ensure that the instruction 208 being pre-fetched will be available when needed. It will be appreciated that the procedure 216, the branch instruction 209, the target instruction 211, the pre-fetch instruction 213, advance_cycles 220, and the pre-fetching tool 102 are described with reference to FIG. 2.

Figure 5C:
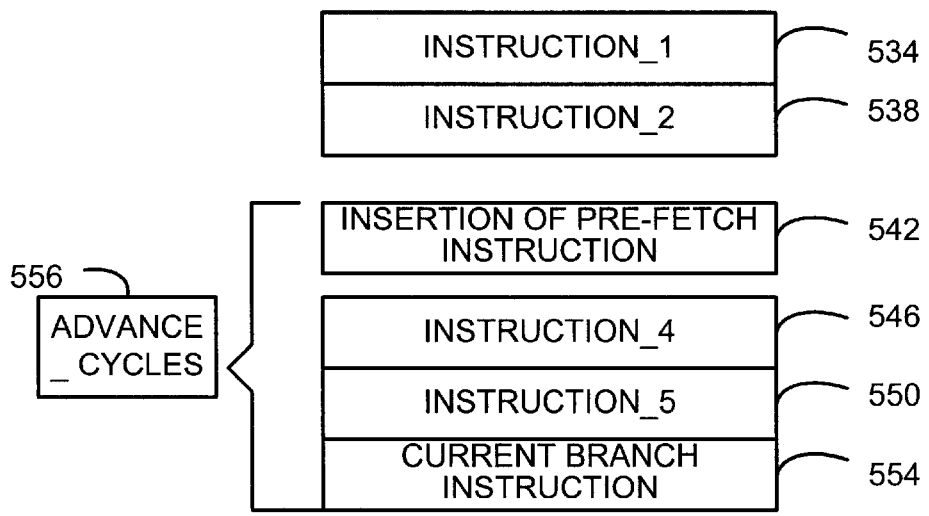
FIG. 5C is a block diagram that illustrates insertion of a pre-fetch instruction.

FIG. 5C is a block diagram that illustrates insertion of a pre-fetch instruction 213 for the target instruction 211. Therefore when the branch instruction 209 is located as shown in element 554, the pre-fetching tool 102 inserts the pre-fetch instruction 213 as shown in element 542. More particularly, the pre-fetching tool 102 locates the pre-fetch instruction 213 of the target instruction 211 advance_cycles 220 in advance of the current branch instruction 209 as shown in element 556. Therefore, the instructions 208 located before the position of the insertion of the pre-fetch instruction 213 do not shift in position, as shown here in element 534 associated with an instruction 208 labeled "1" and in element 538 associated with an instruction 208 labeled "2."

By means of comparison, the instructions 208 that are located after the position of the pre-fetch instruction 213 shift to accommodate the additional pre-fetch instruction 213. Therefore, in the present example, the instruction 208 labeled "4" as shown in element 546, the instruction 208 labeled "5" as shown in element 550, and the current branch instruction 209 as shown in element 554 shift to accommodate the additional pre-fetch instruction 213 as shown in element 542. It will be appreciated that the instruction 208, the pre-fetch instruction 213, the target instruction 211, the branch instruction 209, and the pre-fetching tool 102 are described with reference to FIG. 2.

Figure 5D:
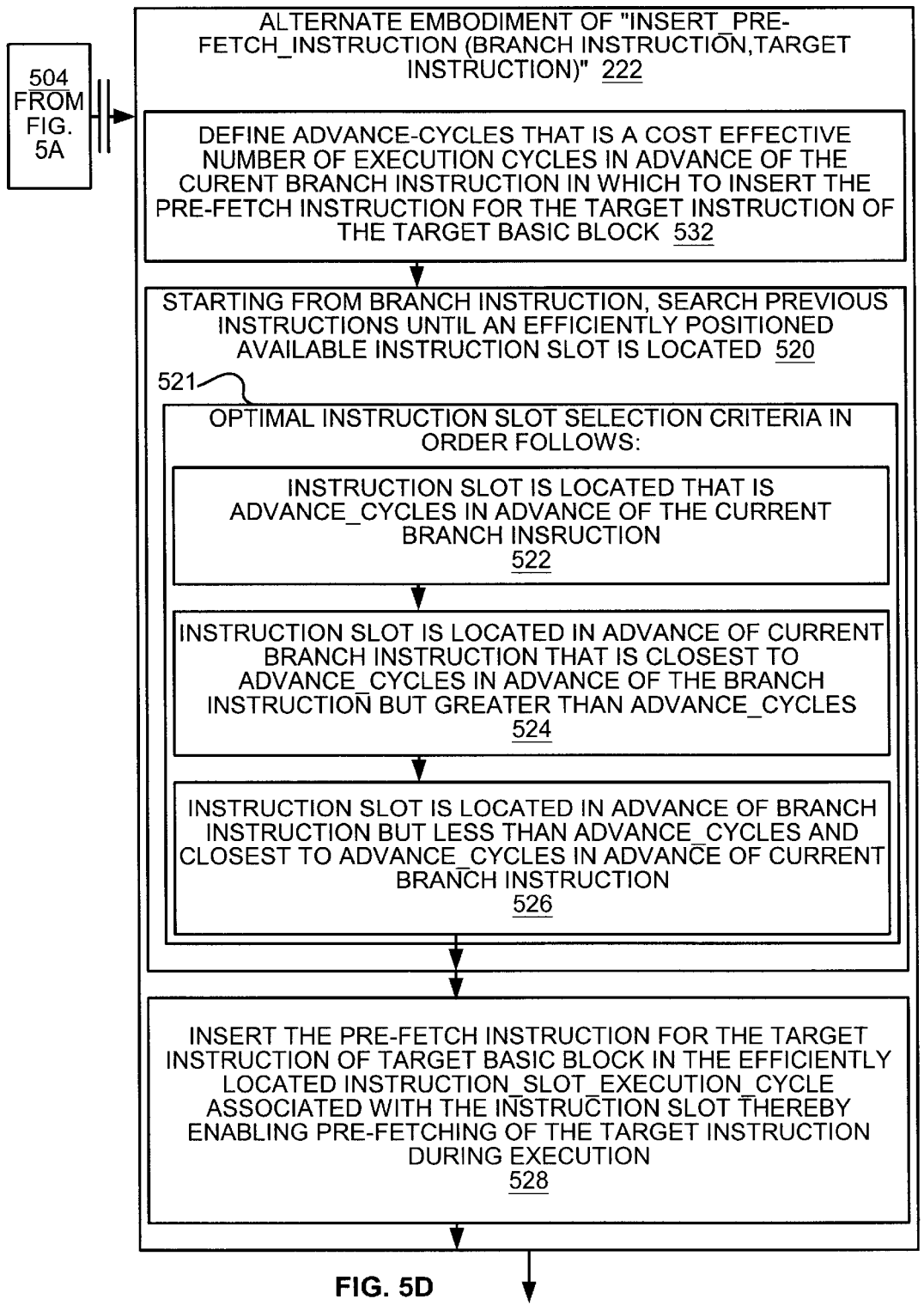
FIG. 5D is a flow diagram that illustrates an alternative embodiment of the operation of inserting a pre-fetch instruction for a target basic block.

FIG. 5D is a flow diagram that illustrates an alternate embodiment of the procedure 216 labeled Insert_Pre-Fetch_Instruction (Branch Instruction 209, Target Instruction 211) 226 that locates an efficient position for the insertion of the pre-fetch instruction 213 of the target instruction 211. The procedure 216 labeled Insert_Pre-Fetch_Instruction (Branch Instruction 209, Target Instruction 211) 226 is called from element 504 as described in FIG. 5A. This alternate embodiment operates on computer systems 100 (as shown in FIG. 1A) that include a mechanism for an instruction slot 221 (as shown in FIG. 2). An instruction slot 221 is discussed with reference to operation slots in *Computer Architecture a Quantitative Approach,* David A. Patterson and John L. Hennessey, 1996 (The VLIW Approach, pp. 284–89).

As shown in element 532, the pre-fetching tool 102 defines an advance_cycles value 220 that is a cost effective number of execution cycles 223 in advance of the current branch instruction 209 at which to insert the pre-fetch instruction 213. As shown in element 520, the pre-fetching tool 102 searches for the location to insert the pre-fetch instruction 213 at the position of an available instruction slot 221. The pre-fetch instruction 213 will be inserted at the instruction_slot_execution_cycle 225 associated with the available instruction slot 221. The pre-fetching tool 102, the advance_cycles 220, the branch instruction 209, instruction_slot_execution_cycle 225, and the pre-fetch instruction 213 are shown in FIG. 2.

Therefore as shown in element 521, the pre-fetching tool 102 searches for an efficiently located instruction slot 221 using the following criteria. Initially the efficiently located instruction slot 221 is determined to be advance_cycles 220 in advance of the current branch instruction 209, as shown in element 522.

If an available instruction slot 221 is not found, the search continues by seeking an available instruction slot 221 in advance of the branch instruction 209 that is closest to the position that is advance_cycles 220 in advance of the branch instruction 209 but still greater than advance_cycles 220, as shown in element 524.

If no available instruction slot 221 is located as discussed with reference to element 524, the search continues for the instruction slot 221 that is located in advance of the current branch instruction 209 and after advance_cycles 220 in advance of the current branch instruction 209. Also the position sought is closest among the instruction slots 221 to a location that is advance_cycles 220 in advance of the current branch instruction 209, as shown in element 526.

It will be appreciated that pre-fetching the target instruction 211 (as shown in FIG. 2) of the target basic block 218 allows more timely execution of the target basic block 218 since the target basic block 218 includes the target instruction 211. After the efficiently located instruction slot 221 is found, the pre-fetch instruction 213 for the target instruction 211 is inserted in the instruction_slot_execution_cycle 225 associated with the instruction slot 221, as shown in element 528, thereby enabling pre-fetching of the target instruction 211 during execution. Recall that the pre-fetching tool 102 operates in cooperation with the pre-fetching services tool 103 (as shown in FIG. 1A) that executes the pre-fetch instruction 213 for the target instruction 211. The target instruction 211 and the trace 212 are shown in FIG. 2.

Figure 5E:
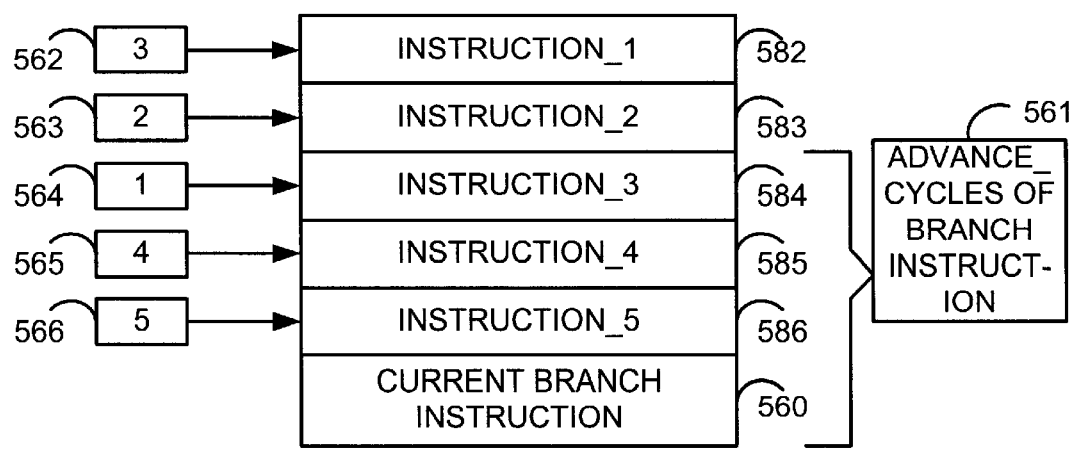

FIG. 5E is a block diagram that illustrates an example of an efficient location of an available instruction slot 221. More particularly, FIG. 5E illustrates the preference of insertion of a pre-fetched instruction 213 for the target instruction 211 in an available instruction slot 221 according to the alternate embodiment of Insert_Pre-Fetch_Instruction (Branch Instruction 209, Target Instruction 211) 226. Therefore, if the instruction 208 labeled "Instruction_

3" as shown in element 584, is located advance_cycles 220, as shown in element 561, in advance of the current branch instruction 209 as shown in element 560, the pre-fetch instruction 213 is efficiently inserted at location 1 as shown in element 564. This operation is described in element 522 with reference to FIG. 5D.

The next available instruction slot 221 sought for the insertion of the pre-fetch instruction 213 is at location 2 as shown in element 563 which is associated with the instruction 208 labeled "Instruction_2" as shown in element 583. This operation is described in element 524 with reference to FIG. 5D. Moving through the instructions 208 that are in advance of the location that is advance_cycles 220 in advance of the current branch instruction 209, the location 3 as shown in element 562 that is associated with the instruction 208 labeled "Instruction_1" as shown in element 582 is the next instruction slot 221 sought for the insertion of the pre-fetch instruction.

If no available instruction slot 221 is located in advance of the instruction 208 that is advance_cycles 220 in advance of the current branch instruction 209, the remaining instructions 208 before the current branch instruction 209 are searched for an efficient instruction slot 221 location for the insertion of the pre-fetch instruction 213. This operation is described in element 526 with reference to FIG. 5D. Therefore, the next location that is used and that is in advance of the current branch instruction 209 is location 4 as shown in element 565 that is associated with the instruction 208 labeled "Instruction_4" as shown in element 585. The final location for the instruction slot 221 that is used and that is in advance of the current branch instruction 209 is location 5 as shown in element 566 that is associated with the instruction 208 labeled "Instruction_5" as shown in element 586. The instruction slot 221 is associated with the instruction_slot_execution_cycle 225 that operates during execution of the program.

Figure 5F:
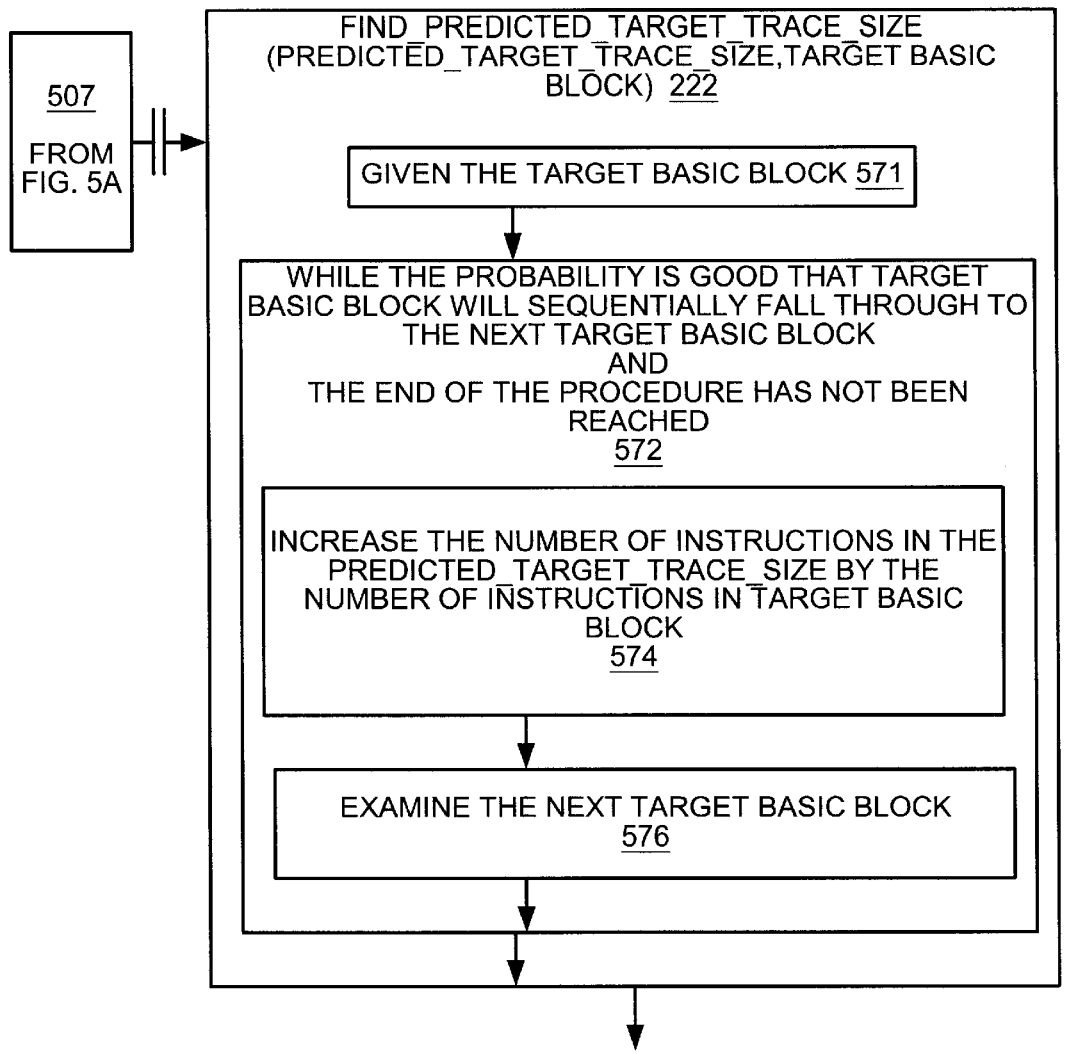
FIG. 5F is a flow diagram that illustrates predicting the target trace size.

FIG. 5F is a flow diagram that illustrates the operation of determining the predicted_target_trace_size 219 as shown in element 222. The pre-fetching tool 102 determines if the predicted_target_trace_size 219 is greater than a minimum threshold 220. A minimum threshold 220 sets the minimum size of a pre-fetched trace 212 such that pre-fetching the trace 212 will be cost effective. The procedure 216 labeled Find_Predicted_Target_Trace_Size (Predicted_Target_Trace_Size 219, Target Basic Block 218) 222 is called from element 507 as described with reference to FIG. 5A.

Initially, the target basic block 218 is examined as shown in element 571. Therefore, as shown in element 572, while the probability that the execution of the target basic block 218 will fall through to the next target basic block 218 is good and the end of the procedure 216 has not been reached, the pre-fetching tool 102 will assess the predicted_target_trace_size 219, as shown in element 574. That is the predicted_target_trace_size 219 will be increased by the number of instructions 208 in the target basic block 218. Finally the next target basic block 218 is examined, as shown in element 576. Therefore, the Find_Predicted_Target_Trace_Size 222 provides the predicted number of instructions 208 for the size of the trace 212. It will be appreciated that the target basic block 218, the procedure 216, the predicted_target_trace_size 219, the trace 212, the instruction 208, and the pre-fetching tool 102 are described with reference to FIG. 2.

Alternative Embodiments

The foregoing description, for purposes of explanation, used specific nomenclature to provide a thorough understanding of the invention. However, it will be apparent to one skilled in the art that the specific details are not required in order to practice the invention. In other instances, well known devices are shown in block diagram form in order to avoid unnecessary distraction from the underlying invention. Thus, the foregoing descriptions of specific embodiments of the pre-fetching tool are presented for purposes of illustration and description. They are not intended to be exhaustive or to limit the invention to the precise forms disclosed, many modifications and variations are possible in view of the above teachings. Those skilled in the art will recognize that changes may be made in form and detail without departing from the scope of the invention. The invention is limited only by the claims.

What is claimed is:

1. A computer implemented method, said computer having memory, a pre-fetch instruction for a target instruction and an augmented for pre-fetching branch instruction, said memory being accessed by at least one instruction generated from a computer readable medium encoded in a program that executes on said computer and said instruction having at least one value, said method comprising:

determining a minimum threshold said value that defines a cost effective pre-fetching size;

accessing a current branch instruction in said program that is associated with said target instruction; and while said current branch instruction is accessed in said program:

inserting said pre-fetch instruction for said target instruction in said program if pre-fetching said pre-fetch instruction for said target instruction is cost effective;

accessing a target basic block associated with said target instruction so that a predicted_target_trace_size said value is determined;

generating said augmented branch instruction to execute said pre-fetch instruction for said target instruction if said predicted_target_trace_size is greater than said minimum threshold thereby improving pre-fetching on said computer; and accessing a next branch instruction if said next branch instruction has not been accessed, associating said next branch instruction with said target instruction, and if said next branch instruction is accessed labeling said next branch instruction as said current branch instruction otherwise labeling said current branch instruction as not accessed.

2. The computer implemented method as set forth in claim 1 wherein said computer further having a plurality of execution cycles, and said step of inserting said pre-fetch instruction for said target instruction in said program further comprising:

defining an advance_cycles said value that is a cost effective number of said execution cycles in advance of said current branch instruction at which to insert said pre-fetch instruction for said target instruction; and inserting said pre-fetch instruction for said target instruction in said execution cycle that is located said advance_cycles in advance of said current branch instruction.

3. The computer implemented method as set forth in claim 1 wherein said computer further having a plurality of execution cycles, at least one instruction slot that is associated with an instruction_slot_execution_cycle, wherein said step of inserting said pre-fetch instruction for said target instruction in said program further comprising:

defining an advance_cycles said value that is a cost effective number of said execution cycles in advance of said current branch instruction at which to insert said pre-fetch instruction for said target instruction;

inserting said pre-fetch instruction for said target instruction at said instruction_slot_execution_cycle if said instruction_slot_execution_cycle is located said advance_cycles in advance of said branch instruction;

otherwise inserting said pre-fetch instruction for said target instruction at said instruction_slot_execution_cycle if said instruction_slot_execution_cycle is located in advance of said advance_cycles in advance of said current branch instruction and said instruction_slot_execution_cycle is located closest among said instruction_slot_execution_cycles to said advance_cycles in advance of said current branch instruction; and otherwise inserting said pre-fetch instruction for said target instruction at said instruction_slot_execution_cycle if said instruction_slot_execution_cycle is located after said advance_cycles in advance of said current branch instruction and before said current branch instruction, and said instruction_slot_execution_cycle is closest among said instruction_slot_execution_cycles to said advance_cycles in advance of said current branch instruction.

4. A pre-fetching tool apparatus in a computer system having memory, a pre-fetch instruction for a target instruction and an augmented for pre-fetching branch instruction, said memory being accessed by at least one instruction generated from a computer readable medium encoded in a program that executes on said computer system and said instruction having at least one value, said apparatus comprising:

a minimum threshold said value;

a current branch instruction in said program that is associated with said target instruction; and while said current branch instruction is accessed in said program:

said pre-fetch instruction for said target instruction being inserted in said program if pre-fetching said pre-fetch instruction for said target instruction is cost effective;

a target basic block being associated with said target instruction so that a predicted_target_trace_size said value is determined;

said augmented branch instruction to execute said pre-fetch instruction for said target instruction being generated if said predicted_target_trace_size is greater than said minimum threshold thereby improving pre-fetching on said computer; and a next branch instruction being accessed if said next branch instruction has not been accessed, said next branch instruction being associated with said target instruction, and if said next branch instruction is accessed said next branch instruction being labeled as said current branch instruction otherwise said current branch instruction being labeled as not accessed.

5. The apparatus as set forth in claim 4 wherein said computer system further having a plurality of execution cycles, wherein said apparatus further comprising:

an advance_cycles said value that is a cost effective number of said execution cycles in advance of said current branch instruction at which to insert said pre-fetch instruction for said target instruction; and said pre-fetch instruction for said target instruction being inserted in said execution cycle that is located said advance_cycles in advance of said current branch instruction.

6. The apparatus as set forth in claim 4 wherein said computer system further having a plurality of execution cycles, at least one instruction slot that is associated with an instruction_slot_execution_cycle, wherein said apparatus further comprising:

an advance_cycles said value that is a cost effective number of said execution cycles in advance of said current branch instruction at which to insert said pre-fetch instruction for said target instruction;

said pre-fetch instruction for said target instruction being inserted at said instruction_slot_execution cycle if said instruction_slot_execution_cycle is located said advance_cycles in advance of said branch instruction;

otherwise said pre-fetch instruction for said target instruction being inserted at said instruction_slot_execution_cycle if said instruction_slot_execution_cycle is located in advance of said advance_cycles in advance of said current branch instruction and said instruction_slot_execution_cycle is located closest among said instruction_slot_execution_cycles to said advance_cycles in advance of said current branch instruction; and otherwise said pre-fetch instruction for said target instruction being inserted at said instruction_slot_execution_cycle if said instruction_slot_execution_cycle is located after said advance_cycles in advance of said current branch instruction and before said current branch instruction, and said instruction_slot_execution_cycle is closest among said instruction_slot_execution_cycles to said advance_cycles in advance of said current branch instruction.

7. An article of manufacture comprising a program storage medium having computer readable code embodied therein for pre-fetching an instruction for a target instruction on a computer, said computer having computer readable program code for a pre-fetch instruction for a target instruction, computer readable program code for an augmented for pre-fetching branch instruction, and computer readable program code for at least one instruction having at least one value that executes on said computer, said article of manufacture comprising:

computer readable program code for determining a minimum threshold said value that defines a cost effective pre-fetching size;

computer readable program code for accessing a current branch instruction in said program that is associated with said target instruction; and while said current branch instruction is accessed in said program:

computer readable program code for inserting said pre-fetch instruction for said target instruction in said program if pre-fetching said pre-fetch instruction for said target instruction is cost effective;

computer readable program code for accessing a target basic block associated with said target instruction so that a predicted_target_trace_size said value is determined;

computer readable program code for generating said augmented branch instruction to execute said pre-fetch instruction for said target instruction if said predicted_target_trace_size is greater than said minimum threshold thereby improving pre-fetching on said computer; and computer readable program code for accessing a next branch instruction if said next branch instruction has not been accessed, associating said next branch instruction with said target instruction, and if said next branch instruction is accessed labeling said next branch instruction as said current branch instruction otherwise labeling said current branch instruction as not accessed.

8. The article of manufacture as set forth in claim 7 wherein said computer further having computer readable program code for a plurality of execution cycles, wherein said article of manufacture further comprising:

computer readable program code for defining an advance_cycles said value that is a cost effective number of said execution cycles in advance of said current branch instruction at which to insert said pre-fetch instruction for said target instruction; and computer readable program code for inserting said pre-fetch instruction for said target instruction in said execution cycle that is located said advance_cycles in advance of said current branch instruction.

9. The article of manufacture as set forth in claim 7 wherein said computer further having computer readable program code for a plurality of execution cycles, computer readable program code for at least one instruction slot that is associated with an instruction_slot_execution_cycle, wherein said article of manufacture further comprising:

computer readable program code for defining an advance_cycles said value that is a cost effective number of said execution cycles in advance of said current branch instruction at which to insert said pre-fetch instruction for said target instruction;

computer readable program code for inserting said pre-fetch instruction for said target instruction at said instruction_slot_execution_cycle if said instruction_slot_execution_cycle is located said advance_cycles in advance of said branch instruction;

otherwise computer readable program code for inserting said pre-fetch instruction for said target instruction at said instruction_slot_execution_cycle if said instruction_slot_execution_cycle is located in advance of said advance_cycles in advance of said current branch instruction and said instruction_slot_execution_cycle is located closest among said instruction_slot_execution_cycles to said advance_cycles in advance of said current branch instruction; and otherwise computer readable program code for inserting said pre-fetch instruction for said target instruction at said instruction_slot_execution_cycle if said instruction_slot_execution_cycle is located after said advance_cycles in advance of said current branch instruction and before said current branch instruction, and said instruction_slot_execution_cycle is closest among said instruction_slot_execution_cycles to said advance_cycles in advance of said current branch instruction.

* * * * *